(12) United States Patent
Panicacci

(10) Patent No.: US 6,529,242 B1
(45) Date of Patent: Mar. 4, 2003

(54) LOOK AHEAD SHUTTER POINTER ALLOWING REAL TIME EXPOSURE CONTROL

(75) Inventor: Roger Panicacci, Los Angeles, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/038,888

(22) Filed: Mar. 11, 1998

(51) Int. Cl.$^7$ .......................... H04N 3/14; H04N 5/335
(52) U.S. Cl. ..................... 348/308; 348/362
(58) Field of Search ................ 348/308, 309, 348/307, 306, 305, 303, 302, 310, 311, 312, 316, 317, 362, 367, 296, 221, 294, 295; 250/208.1; 257/292, 291

(56) References Cited

U.S. PATENT DOCUMENTS

| | | | |
|---|---|---|---|
| 4,819,070 A | * 4/1989 | Hynecek | 348/302 |
| 5,541,654 A | * 7/1996 | Roberts | 348/302 |
| 5,949,483 A | * 9/1999 | Fossum et al. | 348/303 |
| 6,115,065 A | * 9/2000 | Yadid-Pecht et al. | 348/308 |
| 6,243,134 B1 | * 6/2001 | Beiley | 348/308 |

* cited by examiner

Primary Examiner—Aung S. Moe
(74) Attorney, Agent, or Firm—Fish & Richardson P.C.

(57) ABSTRACT

Look ahead shutter pointer used for exposure control determination. One shutter is used to remove the pixels from reset. This begins the integration process. The pixels are integrated by turning them on one by one and sampling their outputs sometime later. The amount of time between turning them on and sampling them can be varied. This can be done while the system is being used. In the preferred embodiment the time of exposure is changed at the interface between two frames to avoid problems in the image.

11 Claims, 12 Drawing Sheets

LOOK AHEAD SHUTTER POINTER ALLOWING REAL TIME EXPOSURE CONTROL

BACKGROUND OF THE INVENTION

Image sensors are often embodied by a plurality of photo sensitive pixels. Each pixel receives information indicative of a portion of the image. The information is in the form of incoming photocarriers indicative of the incoming light photons. Each pixel accumulates photocarriers indicative of the amount of light impinging on that pixel. That amount of time is often called the exposure.

SUMMARY OF THE INVENTION

The present invention describes varying the pixel exposure by varying the time between enabling the pixel to integrate and reading the pixel. The pixels are formed into an array of pixels. Two counters are used to address the array. One counter, called the shutter pointer, keeps track of the address of the pixels that will next be enabled. Once enabled, those pixels will begin to integrate. The other counter called the read counter keeps track of the row address to be read. The time between enabling and reading determines the exposure.

For any given exposure, the difference between these two counters is always the same. Each pixel in the array hence gets the same amount of exposure, thereby avoiding one portion of the image having a different look than another.

The exposure can be changed by an automatic exposure technique or by manual input from the user. The change of exposure changes the difference between the enable and read addresses.

One aspect is to change this exposure using a seamless technique in which no one image/field has internally-varying characteristics. This is done without changing the frame rate or diffusing the exposure difference for pixels within the same frame.

Another aspect uses a third counter to look ahead to the next frame while the read pointer and shutter are processing the current frame. This third counter evaluates the program exposure at the start of a new frame. When the exposure changes, the third counter is advanced to the next frame. The current frame with the old exposure is simultaneously processed.

BRIEF DESCRIPTION OF THE DRAWINGS

These techniques will be described with reference to the accompanying drawings wherein.

DESCRIPTION OF THE PREFERRED EMBODIMENTS

The present invention is specifically intended for use in an image sensor of the active type. The specific embodiment uses an active pixel sensor of the type described in U.S. Pat. No. 5,471,515, the disclosure of which is incorporated by reference to the extent necessary for understanding of the invention. However, any CMOS image sensor or, more generally, any image sensor of any type could be used according to these techniques.

Figure 1:
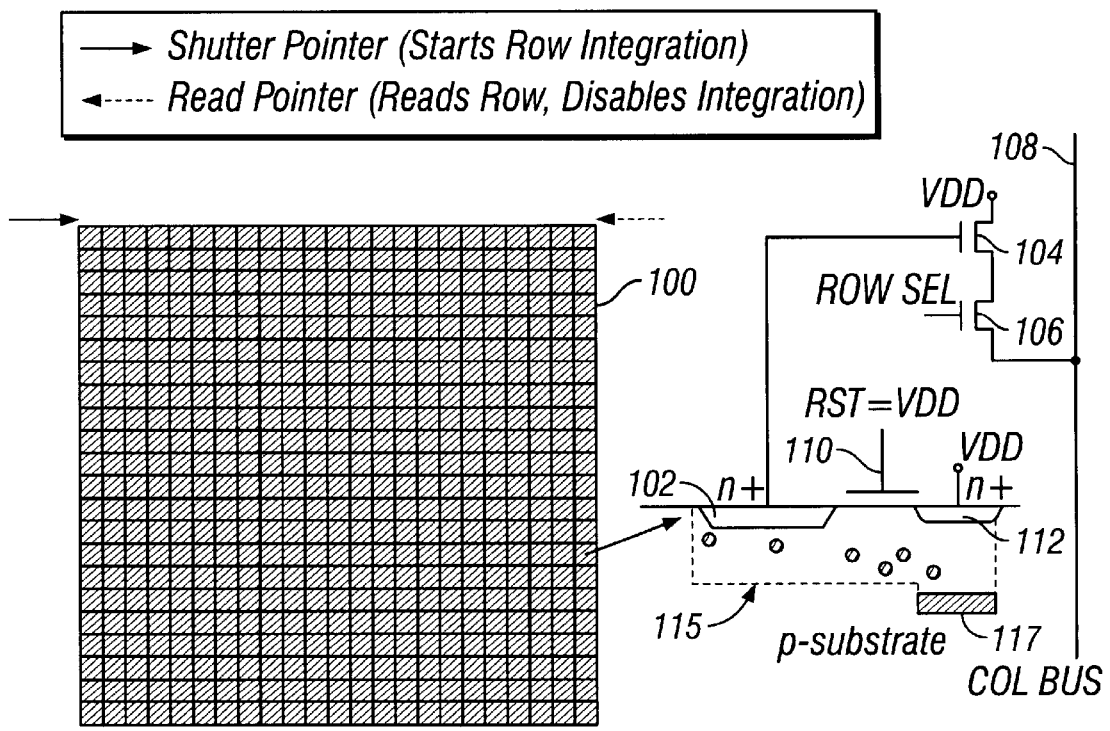
FIG. 1 shows the system with the shutter closed and the array and the reset state.

FIG. 1 shows a block diagram of the active pixel sensor array, along with a sample schematic of the way the array can operate. While this system shows a photodiode pixel, it should be understood that this method applies to any kind of pixel including, for example, a photogate pixel.

When the array is in the reset state, the APS array 100 shows all pixels as being shaded, meaning that all are in the "don't care" state.

The pixels are collectively sampled into an A/D converter using a system with a floating diffusion 102 that is sampled into a source follower 104. The output of the source follower 104 is also sampled through a row selector transistor 106 onto column bus 108. The column bus 108 is coupled into the A/D converter array described herein.

Figure 1A:
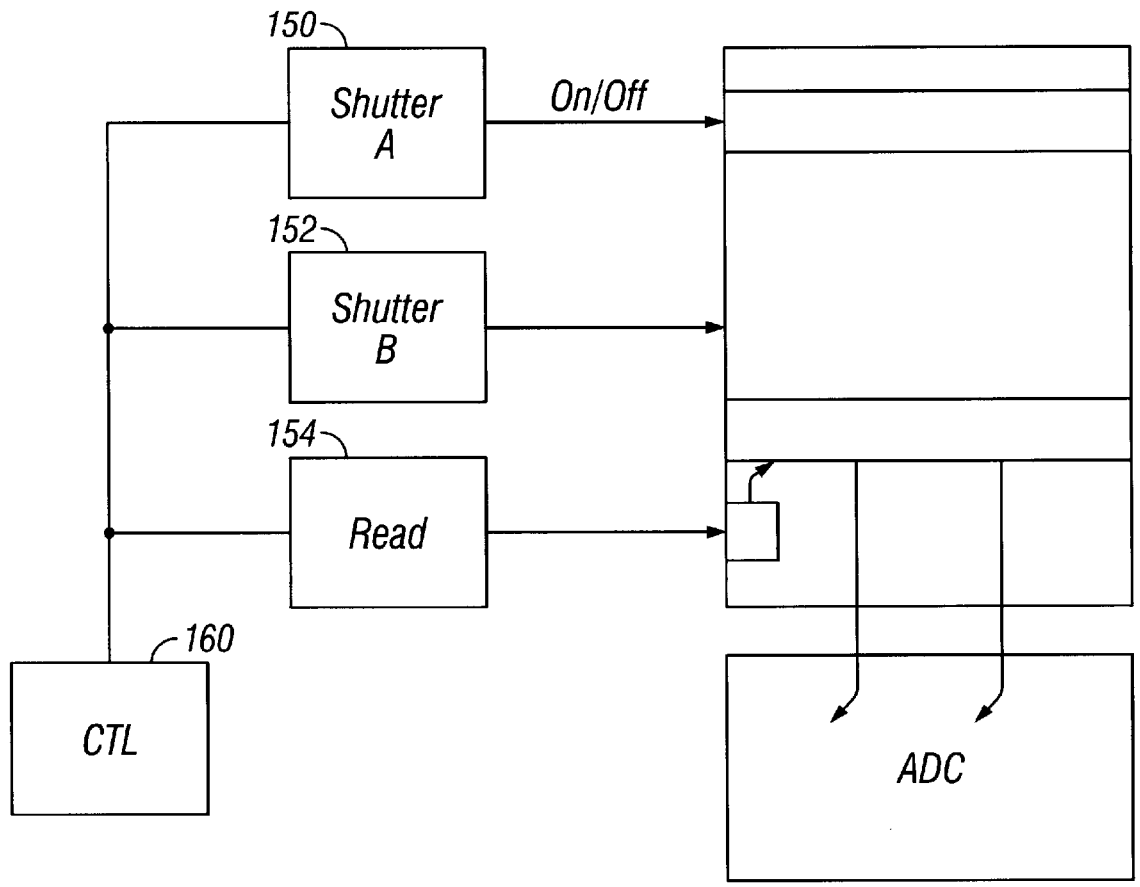

The control circuit is shown in block diagram form in FIG. 1A. Two shutter pointers: shutter A 150 and shutter B 152 are provided. These pointers respectively begin the row integration process by releasing the row from reset. The row is reset by providing a VDD potential on the gate 110 that connects the floating diffusion 102 to a sink well 112. When the reset value is released, the floating diffusion 102 can accumulate charge from incoming photocarriers.

Counter 154 represents the read counter which selects the transistor 106 and thereby provides the output signal to the A/D converters.

In FIG. 1, the shutter is closed meaning that the gate 110 is in the reset state. The potentials of the various elements are shown in state diagram 115: all incoming photocarriers are sinked to the well 117.

Figure 2:
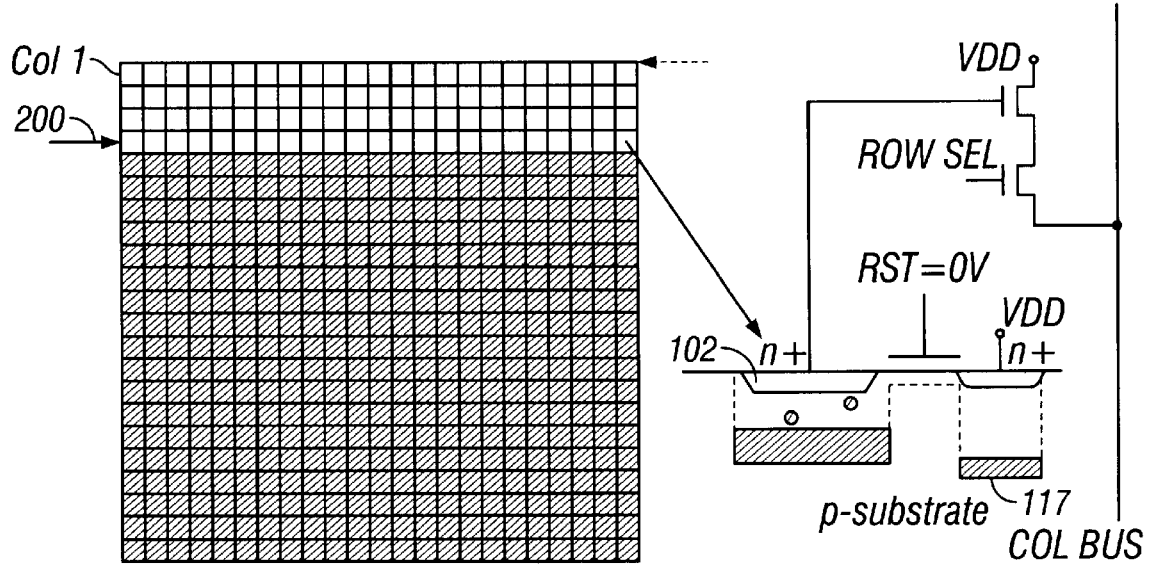
FIG. 2 shows the start of exposure.

In FIG. 2, the exposure is started. This is done by advancing the shutter counter (shutter A 150) through the array selectively releasing the array from reset. The rate at which the opening is advanced through the array is equal to the read row rate. The operation occurs by releasing the reset to each row in a timed manner. The timing is controlled by controller 160 which can be dedicated logic or a microprocessor.

FIG. 2 shows how the states change when reset is released. Each floating diffusion begins to integrate charge once released. The read pointer is disabled, to avoid any false reads.

In this example of FIG. 2, column 4, shown by pointer 200, is being advanced cyclically. Therefore, column 1 has been opened for the time of 4 clock rate exposures.

Figure 3:
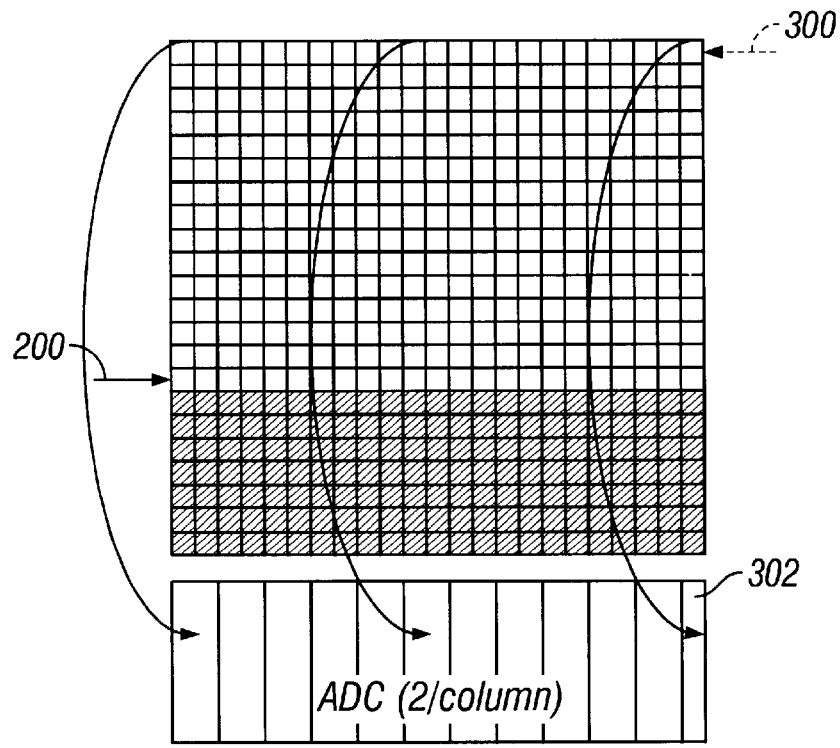
FIG. 3 shows the advance of the shutter.

FIG. 3 shows the operation continuing. Pointer 200 has now reached the 15th row and in this example, we assume that 15 exposure cycles are desired for a total exposure time of 15-N where N is a time between subsequent advances of the shutter. When N=15, the read pointer 154 is enabled; shown as element 300. The enabling of read pointer 300 enables the row select 106 and thereby provides the charge from that row onto the column bus 108 into associated A/D converter 302. In this example, therefore, the first row of the array is read into the column processing A/D circuits. The shutter advancing speed matches the row processing speed. Here, the shutter width equals 14 rows and the pixel integration time equals 14 times the process time per row.

After reading out the row, the reset for that particular row is again brought high to maintain the pixel in reset.

Figure 4:
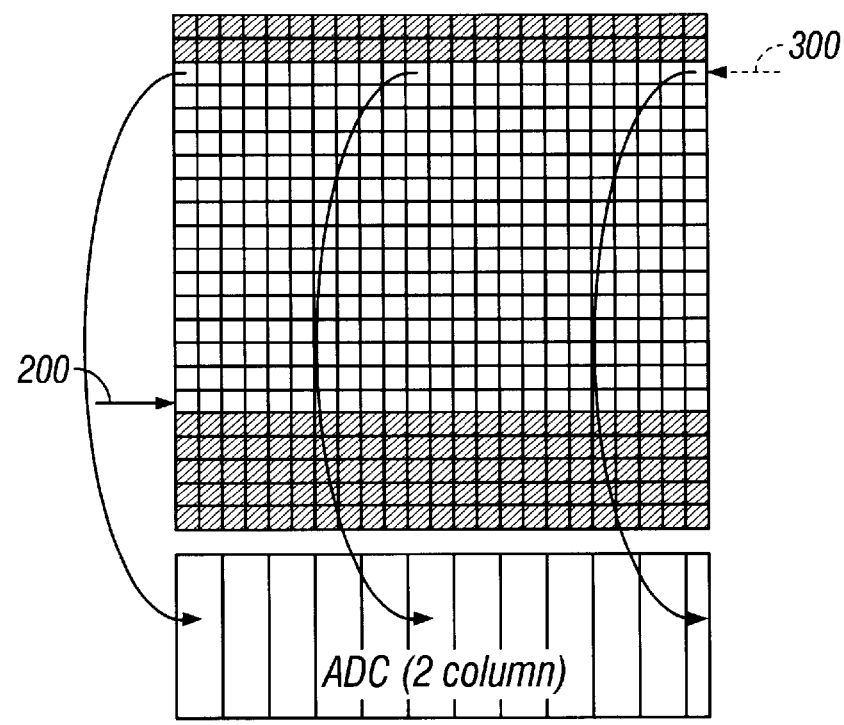
FIG. 4 shows how each row is read into an analog to digital converter and the shutter is closed behind it.

FIG. 4 shows the continuation of the process. The read pointer 300 is always 15 rows behind the shutter pointer 200. Each row is read into the A/D converter, and the shutter is closed behind it by bringing the appropriate reset transistor 110 into reset.

Figure 5:
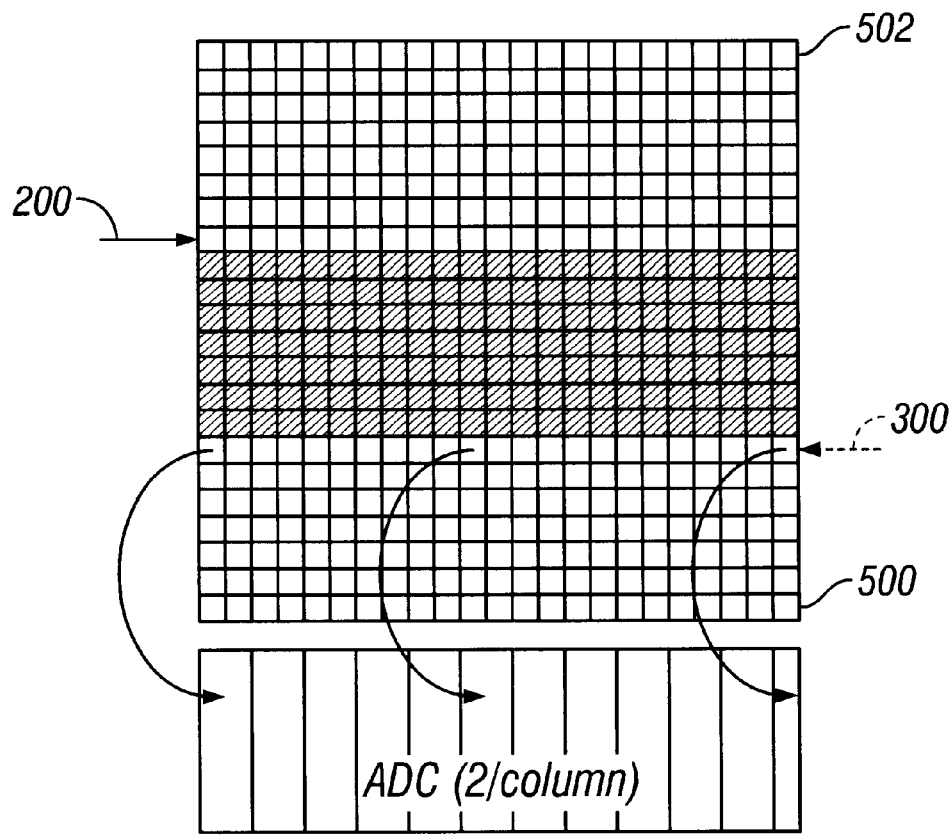
FIG. 5 shows the positions of the read pointer and shutter pointer as the process continues.

FIG. 5 shows the way in which the pointers wrap around. When the shutter pointer reaches the bottom 500 of the array, it wraps back around to the top 502 of the array. The read pointer is still reading behind the time of the shutter pointer enablement.

Figure 6:
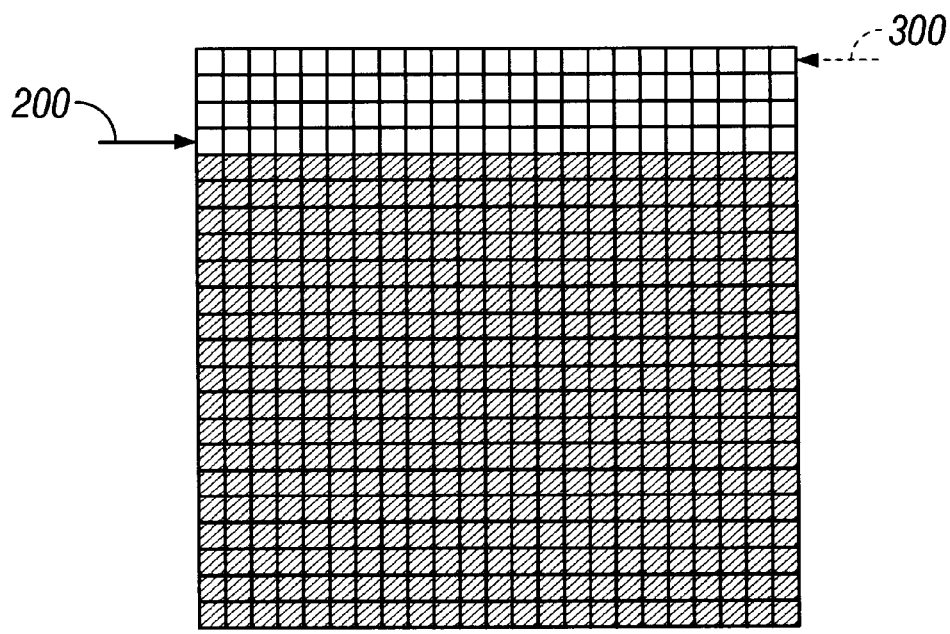
FIG. 6 shows the first step in a process of changing the exposure.
Figure 5A:
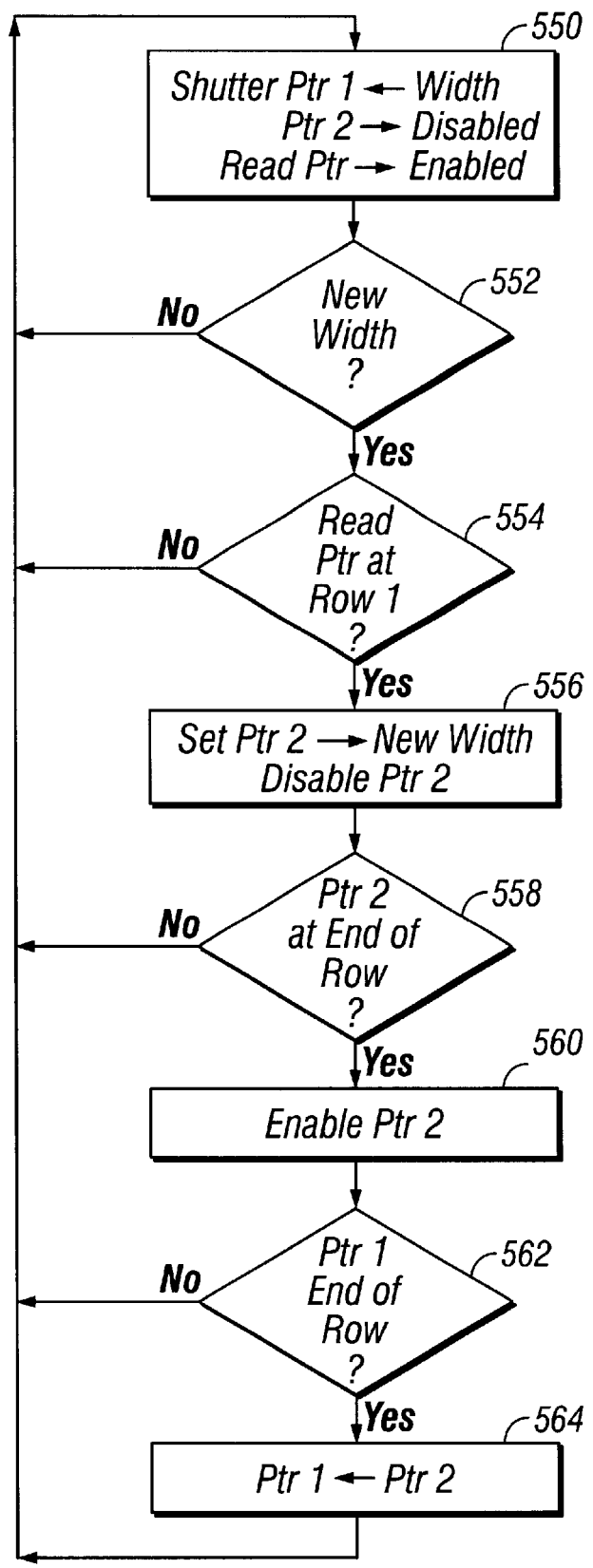

The operation of selecting a new frame is shown in the flow chart of FIG. 5A and with reference to FIGS. 6–14. FIG. 6 shows the beginning of a new frame. As shown in step 550 of the flow chart of FIG. 5A, the shutter pointer 1 is set to the desired width, pointer 2 is disabled, and the read pointer is enabled. The read pointer tells the pixels to be read a specified amount of time after the shutter pointer has enabled them. FIG. 6 shows the system operating with the current shutter width of three rows.

Figure 7:
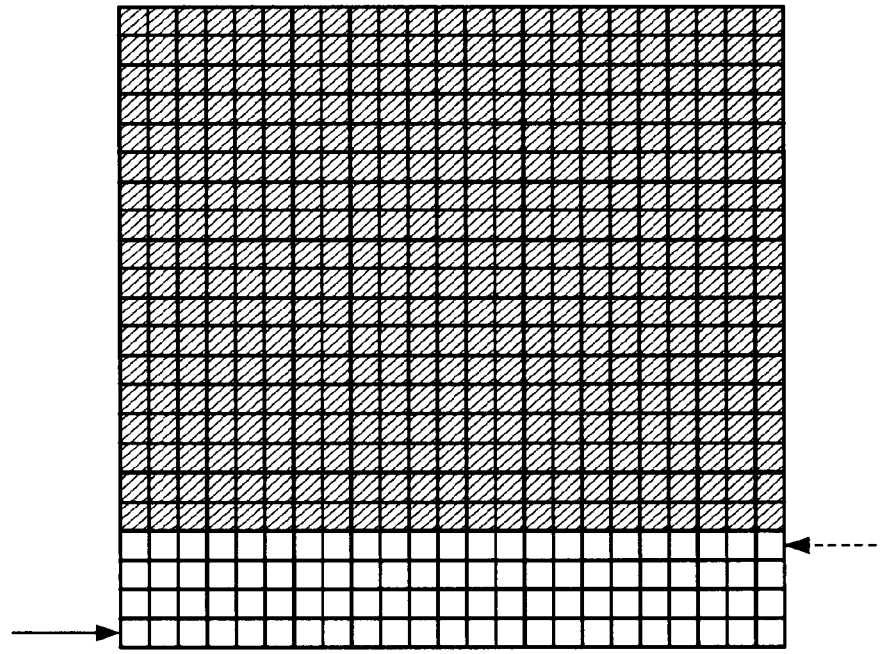
FIG. 7 shows the shutter conditions at the bottom of that window.
Figure 8:
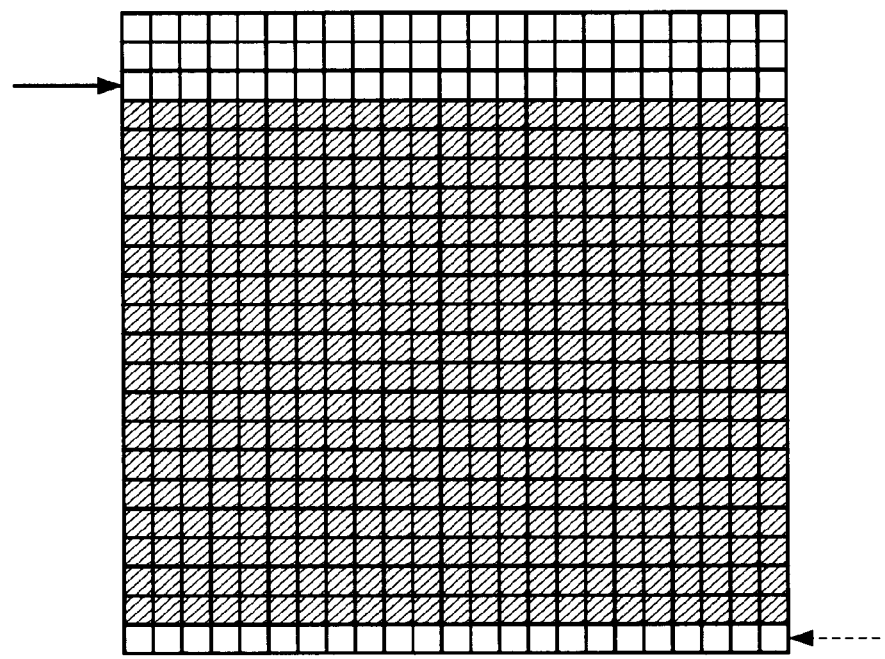
FIG. 8 shows the bottom of the window and the beginning of the next window.
Figure 9:
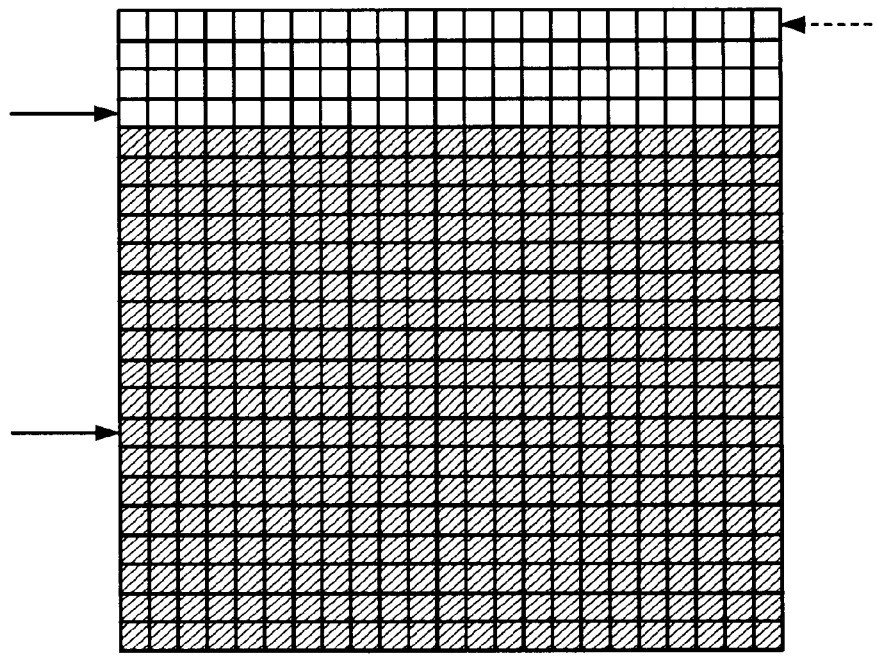
FIG. 9 shows the complete new frame with the set up shutter width.
Figure 10:
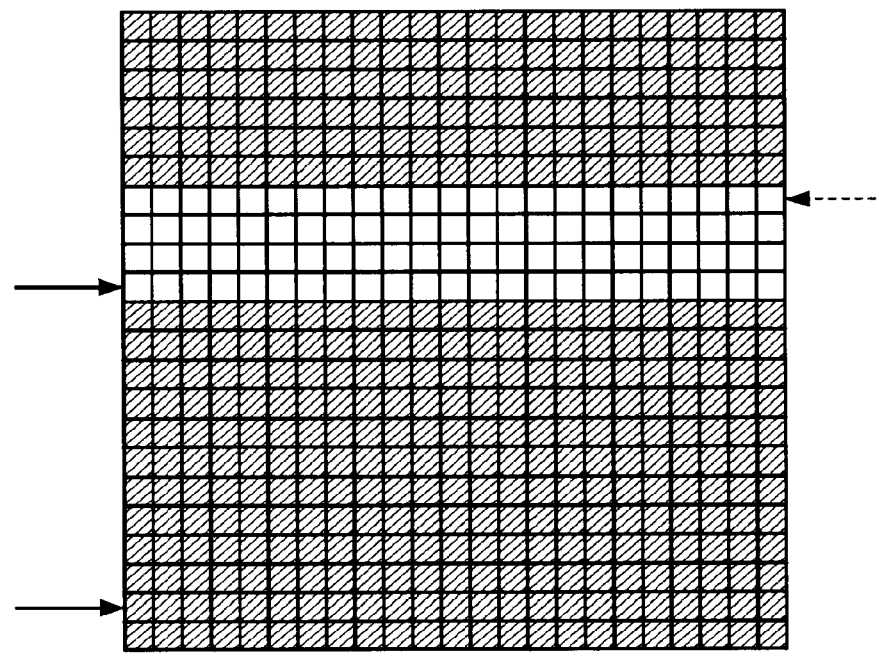
FIG. 10 shows continuation of the reading.
Figure 11:
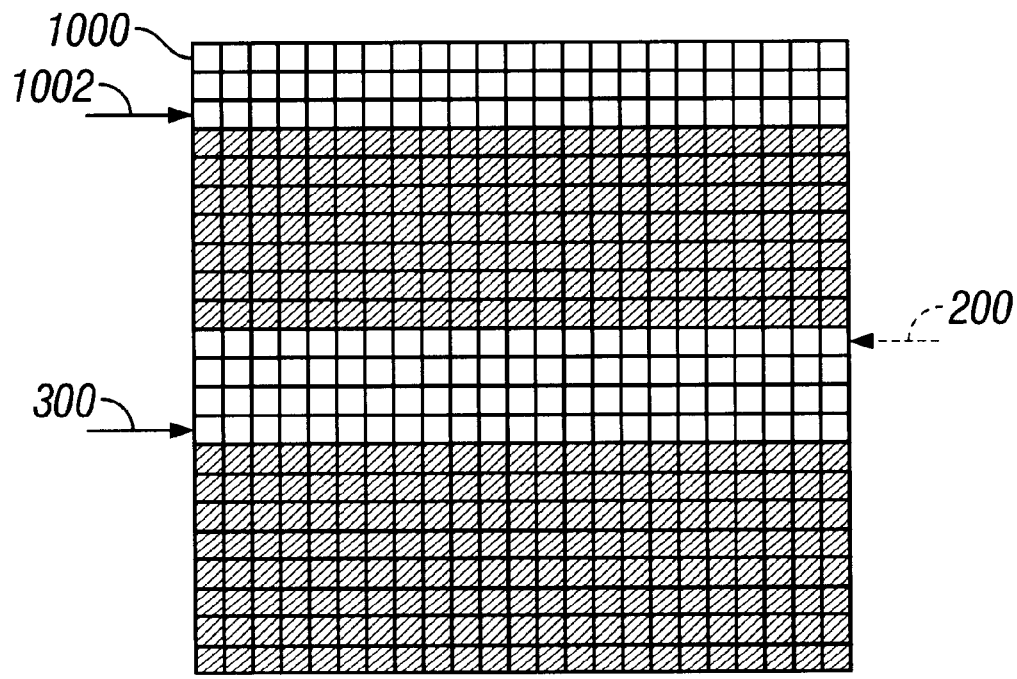
FIG. 11 shows the new pointer initiating a new shutter width.

Some time after the operation of FIG. 6, the user enters a new shutter width as shown in step 552. The new shutter width in this example is 14 rows although it could be any value. FIG. 7 shows the shutter reaching the bottom of the window. FIG. 8 shows the read pointer reaching the bottom of the window and FIG. 9 shows the read pointer reaching the top of the window. When the read pointer reaches the top, as detected at step 554, the shutter pointer number 2 is set to the new width. However, pointer number 2 remains disabled at this time and through the operation of FIG. 10 where it moves in step with pointer 1 and the read pointer. This is represented as step 556 in FIG. 5A. When pointer number 2 reaches the end of the row, as detected at step 558 and shown in FIG. 11, it is enabled to initiate the new shutter width. The read pointer 200 is still reading three rows behind the shutter pointer 1 300. However, subsequent top rows such as 1000 are being turned on by shutter pointer 2 1002.

Figure 12:
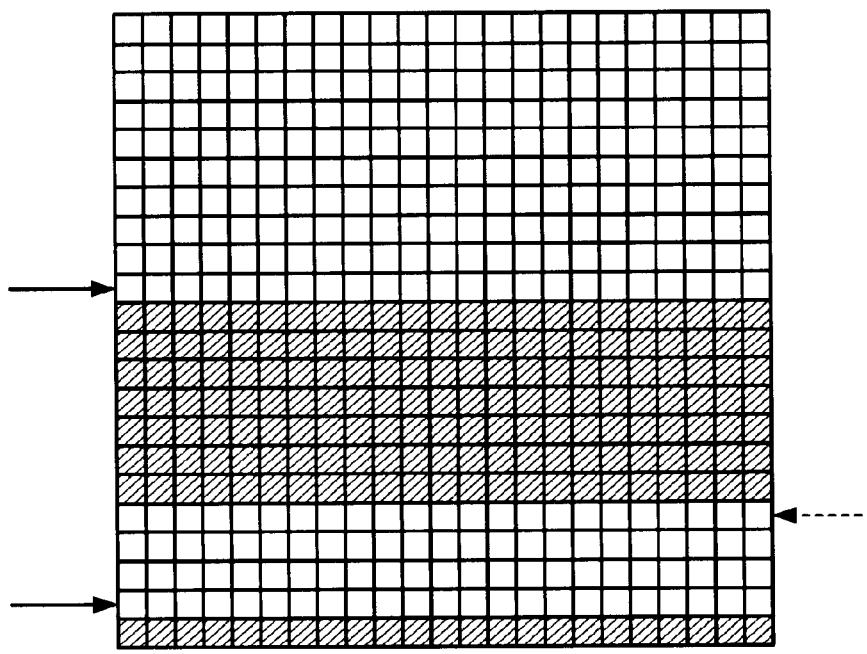
FIG. 12 shows the continuation of the reading with both shutters enabled.
Figure 13:
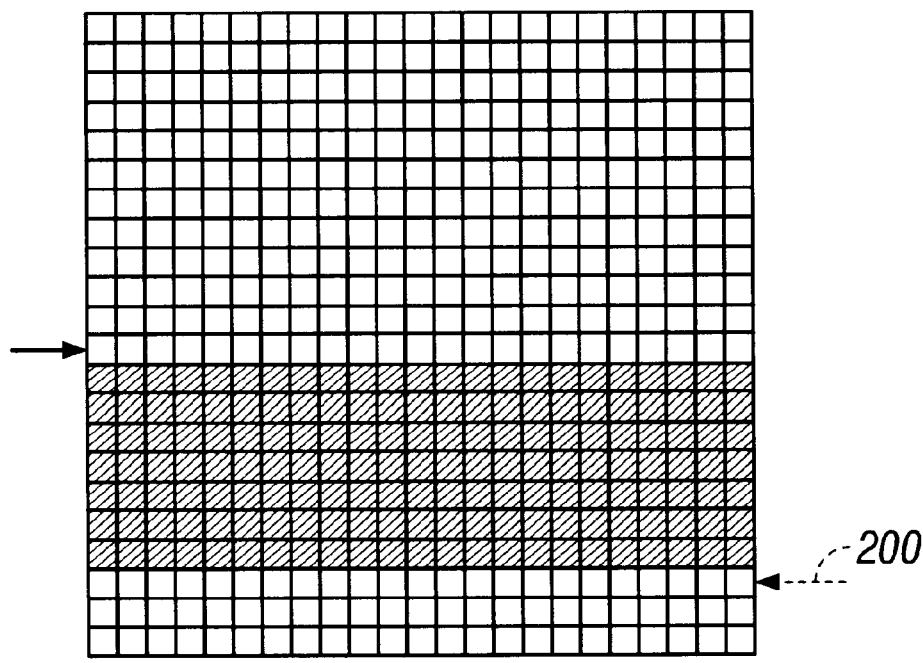
FIG. 13 shows the first shutter pointer wrapping around loaded with the second shutter pointer value.
Figure 14:
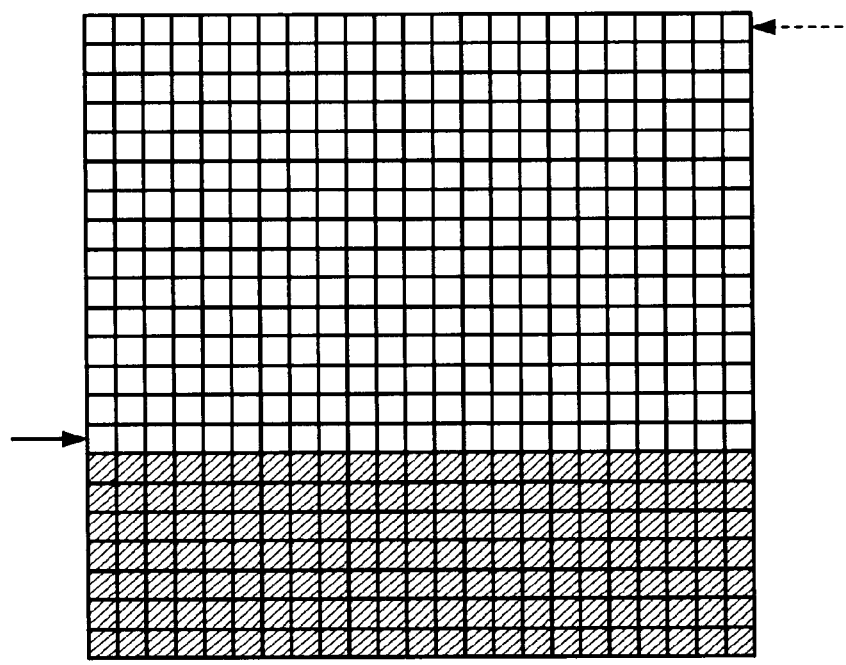
FIG. 14 shows the new frame starting with the updated shutter width.

This is shown generally as step 560 in FIG. 5A. The reads continue as shown in FIG. 12. When pointer 1 reaches the bottom of the row, in step 562 in FIG. 13, pointer 1 receives the contents of pointer 2 (step 564) and wraps around loaded with the value of pointer 2. Therefore, when the read pointer 200 reaches the bottom of the row, the bottom-most row receives the last three row exposure. The top of the next row, shown in FIG. 14, has a 14-row shutter width.

Figure 15:
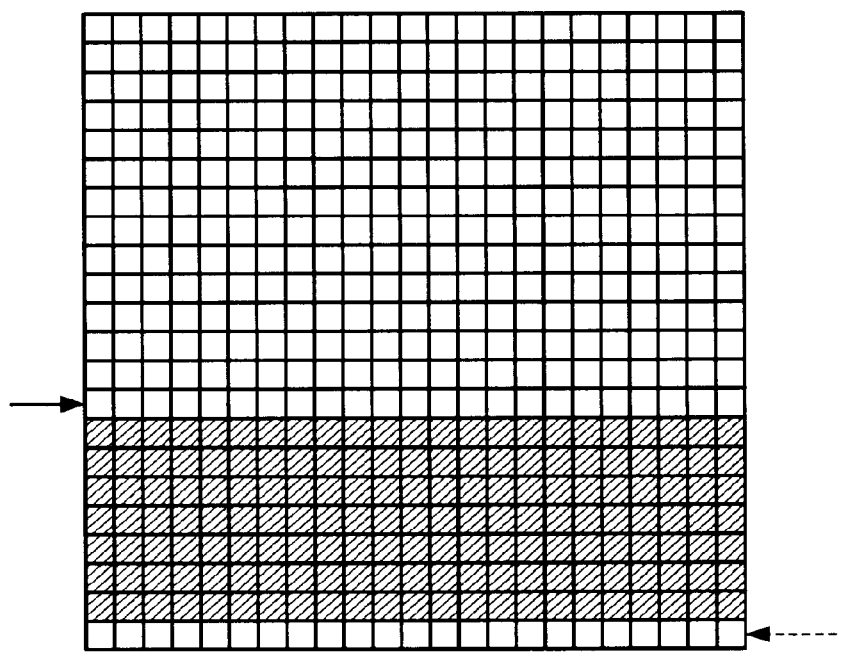
FIG. 15 shows the beginning point of a user entering a new shutter width which is smaller than the old shutter width.
Figure 16:
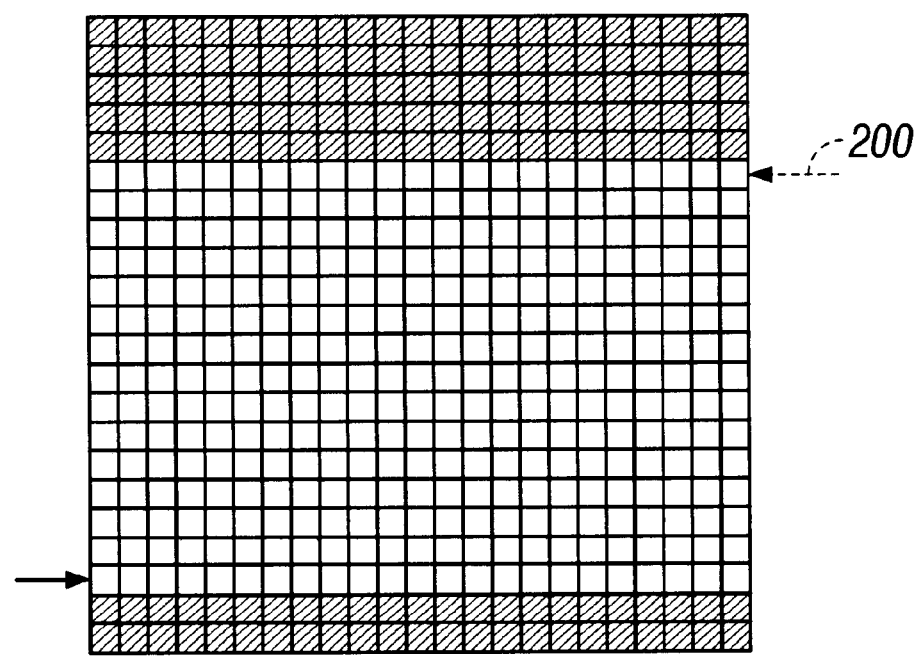
FIG. 16 shows the shutters enabled and disabled as the bottom of the current array is reached.
Figure 17:
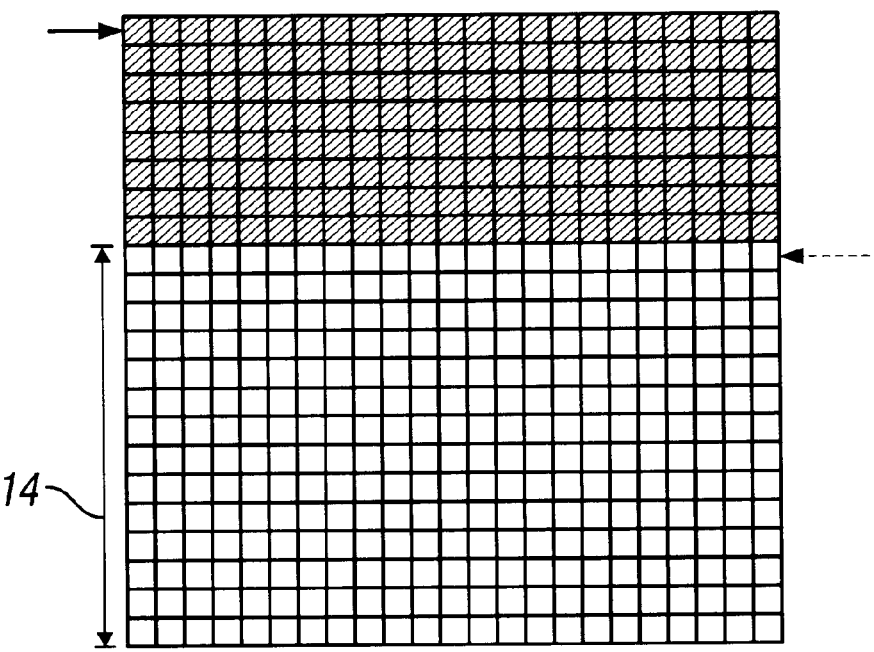
FIG. 17 shows the shutter pointer wrapping around and waiting for the read pointer to collapse the shutter width.

The opposite operation is carried out for shortening the row as shown in FIG. 15. FIG. 15 represents the time when the user enters a new shutter width that is smaller. FIG. 15 shows a 14-width row, and the new shutter width is 8 rows. An analogous operation occurs, with FIG. 16 showing the read pointer 200 and 2 shutter pointers.

Figure 18:
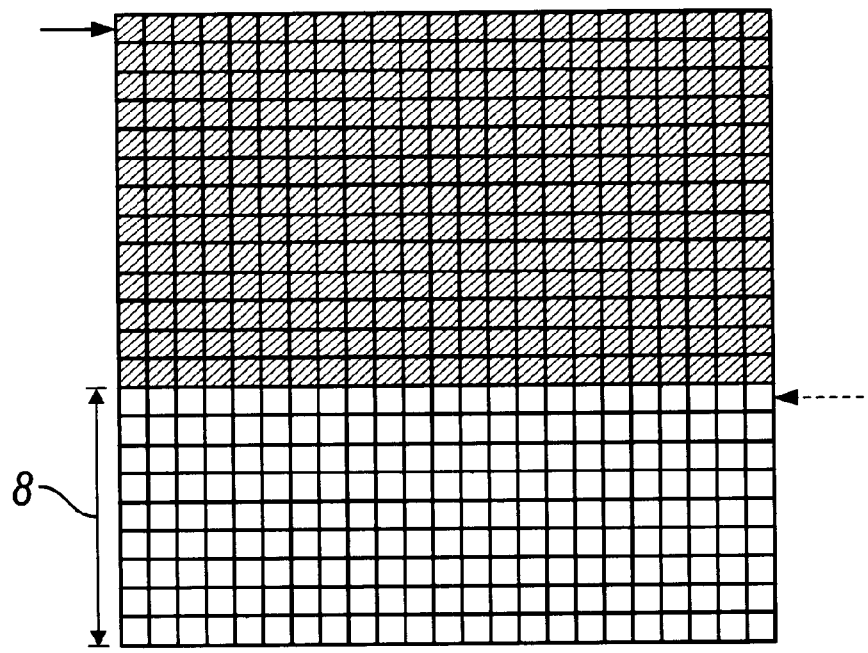
FIG. 18 shows the continuation of the shutter pointer as it continues to wait.
Figure 19:
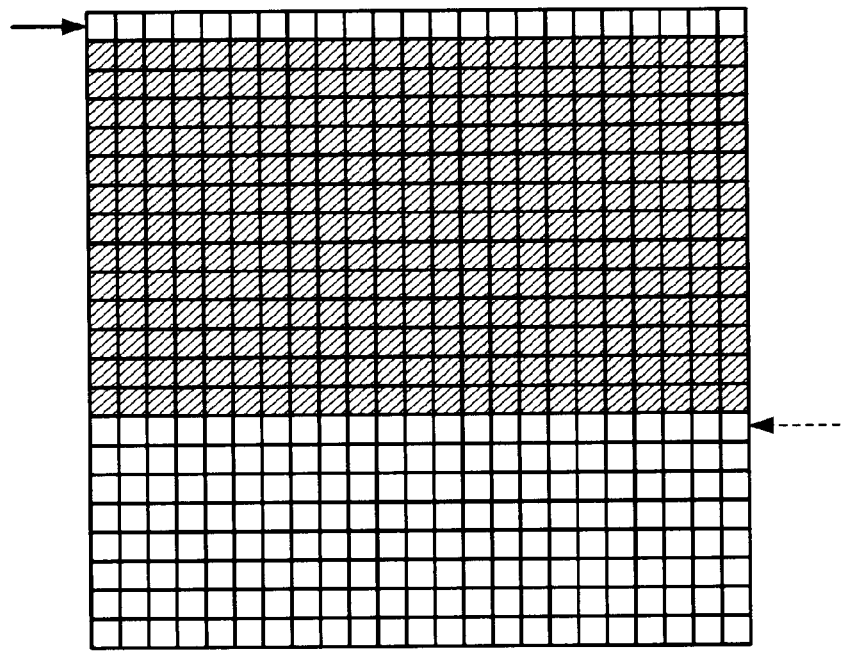
FIG. 19 shows the shutter pointer starting the next frame with the new collapsed shutter width.
Figure 20:
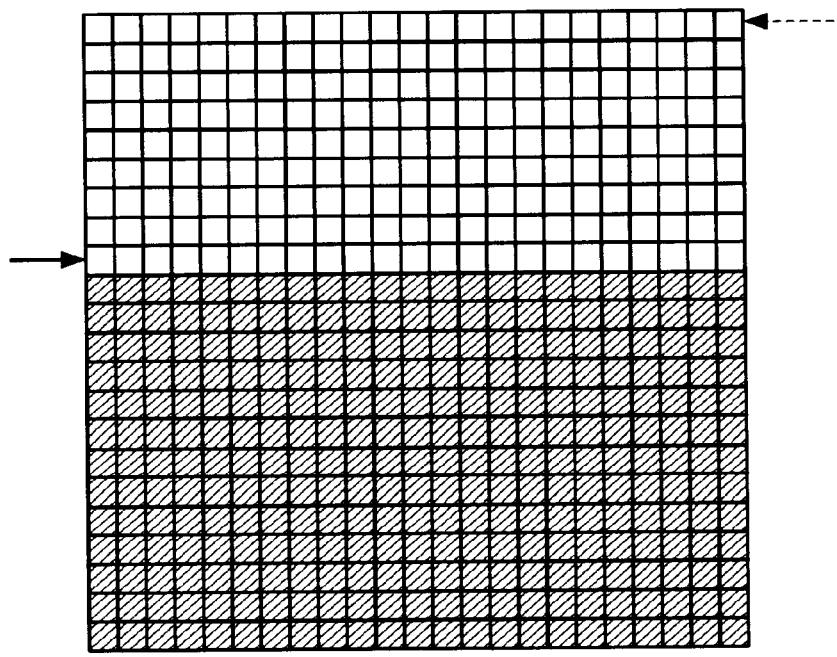
FIG. 20 shows the new frame with the updated shutter path.

When the shutter pointer wraps around, the read pointer is still 14 columns behind the shutter pointer. The shutter pointer, however, does not change value until the read pointer collapses the shutter width to 8 columns as shown in FIG. 18. At that time, the shutter pointer starts moving again as shown in FIG. 19. The new frame with updated shutter width is shown in FIG. 20.

The system described herein could be carried out using a processor or hard-wired logic. The preferable way to do this is digital control of the logic using gates defined in hardware description language or HDL.

Embodiments are contemplated and are supported by the claims.

What is claimed is:

1. A system of varying an integration time of light integrating elements, comprising:

a plurality of pixel elements, arranged in rows;

first and second counters defining first, second and third pointer elements, including said first pointer element pointing to a row of pixels to be currently read and said second and third pointer element pointing to a row of pixels to be currently enabled, and wherein said second and third pointer elements are alternately enabled and disabled, said second pointer element being enabled after enabling said first counter by a delay that is a predetermined, selectable, and variable amount;

an integration time changing system, including an accepting means accepting a command to change an amount of integration time of the pixels; and a control system, which changes the amount of time between enabling the row and reading the row based on said integration time obtained by said accepting means while said plurality of pixel elements are receiving multiple frames of images.

2. The system as in claim 1, wherein said control system operates to change said integration time at a time when at least one of said pointers defines a location at beginning or an end of said rows.

3. The system as in claim 1, further comprising a reset element, which holds said pixels in reset prior to enablement by said second pointer, and which returns said pixels to reset after reading as commanded by said first pointer.

4. A system as in claim 1, wherein an integration time is changed by switching from an amount of time between first and second pointers to an amount of time between first and third pointers.

5. A system as in claim 1, wherein said control system enables said third pointer at a time based on a position of said first pointer .

6. A system as in claim 5, wherein said third pointer is enabled at a time when reading based on said second pointer will enable reading based on said third pointer, during a subsequent cycle.

7. A method of reading an array of pixels, comprising:
arranging said pixels into an array of rows and columns;
reading at least a plurality of pixels defining a row;
holding said pixels in reset except when enabled;
using a first pointer to enable said pixels and remove it from reset;
determining a variable time of integration for said pixels;
waiting said variable amount of time after said first pointer enables said pixels, and then using a second pointer to read said pixels;
defining a third pointer which enables said pixels; and
changing said variable time of integration while said pixels are being read and enabled.

8. A method as in claim 7, wherein there is a specified total number of rows, when a maximum row number is reached, said pointers wrap around to begin starting at a lowest row number, and wherein said variable time of integration is changed at a time when said pointers wrap around.

9. A method as in claim 7, wherein said changing said variable time of integration comprises switching from said first pointer to said third pointer.

10. A method as in claim 9, wherein said switching comprises switching at a time when said second pointer will allow reading all signals.

11. A method as in claim 9, wherein said switching comprises switching at that time near an end of a reading cycle for a specified frame, at a time when a reading cycle for the next frame will read at a new time of integration.

* * * * *